United States Patent [19]

Abernathy

[11] 4,030,670

[45] June 21, 1977

[54] GARBAGE RECYCLING APPARATUS

[76] Inventor: Frank W. Abernathy, 603 Shadow Lane, Jonesboro, Ark. 72401

[22] Filed: Dec. 17, 1975

[21] Appl. No.: 641,592

Related U.S. Application Data

[63] Continuation-in-part of Ser. No. 484,450, June 28, 1974, abandoned.

[52] U.S. Cl. .................................. 241/14; 241/24; 241/29; 241/76; 241/154; 241/236; 241/DIG. 38
[51] Int. Cl.² ...................................... B02C 21/00
[58] Field of Search .................. 241/14, 24, 25, 29, 241/41, 42, 76, 79.1, 101.2, 101.5, 152 R, 152 A, 154, 236, 251, 253, DIG. 38; 209/127 R, 127 A, 127 B, 127 C, 128, 129

[56] References Cited

UNITED STATES PATENTS

| | | | |
|---|---|---|---|
| 345,408 | 7/1886 | Birge | 241/253 |
| 996,958 | 7/1911 | Wallick | 241/236 |
| 1,110,896 | 9/1914 | Comstock | 209/129 |
| 1,731,956 | 10/1929 | Wagner | 241/236 |
| 2,606,721 | 8/1952 | Neff | 241/253 |
| 2,786,635 | 3/1957 | Oishi | 209/127 R |
| 3,650,396 | 3/1972 | Gillespie et al. | 241/DIG. 38 |
| 3,680,796 | 8/1972 | Galeano | 241/DIG. 38 |
| 3,720,380 | 3/1973 | Marsh | 241/24 |
| 3,802,631 | 4/1974 | Boyd | 241/25 |
| 3,941,316 | 3/1976 | Pierce | 241/79.1 |

*Primary Examiner*—Granville Y. Custer, Jr.
*Attorney, Agent, or Firm*—Clarence A. O'Brien; Harvey B. Jacobson

[57] ABSTRACT

Structure is provided for successively decompacting waste, such as garbage and trash, at a metered rate, weighing the decompacted waste at a metered rate and separating the heavier portions of the waste from the remainder thereof, coarse shredding the remaining waste at a metered rate and in a manner to gradually reduce the remaining waste to increasingly smaller shredded material, fine shredding the shredded material at a metered rate, acting upon the fine shredded material at a metered rate to break up and pulverize the pieces of glass therein, subjecting the waste to a wash bath while agitating the waste with jets of air and collecting the particles of glass which are dislodged from the waste in the bath by the action of the air jets, drying the remaining waste and thereafter separating ferrous materials from the remaining waste through the utilization of magnetic lines of flux and subsequently separating particles of aluminum from the remaining waste.

20 Claims, 15 Drawing Figures

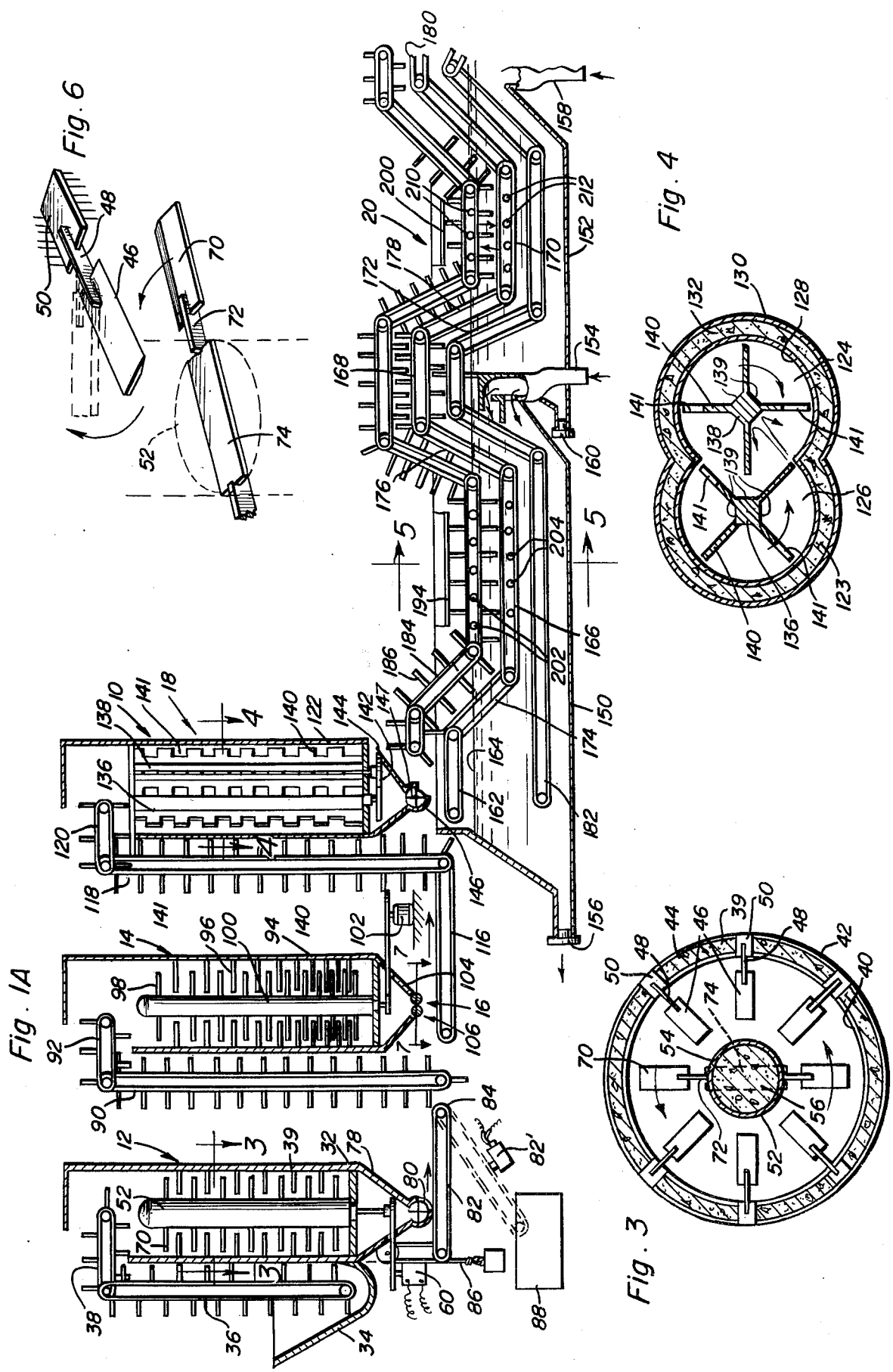

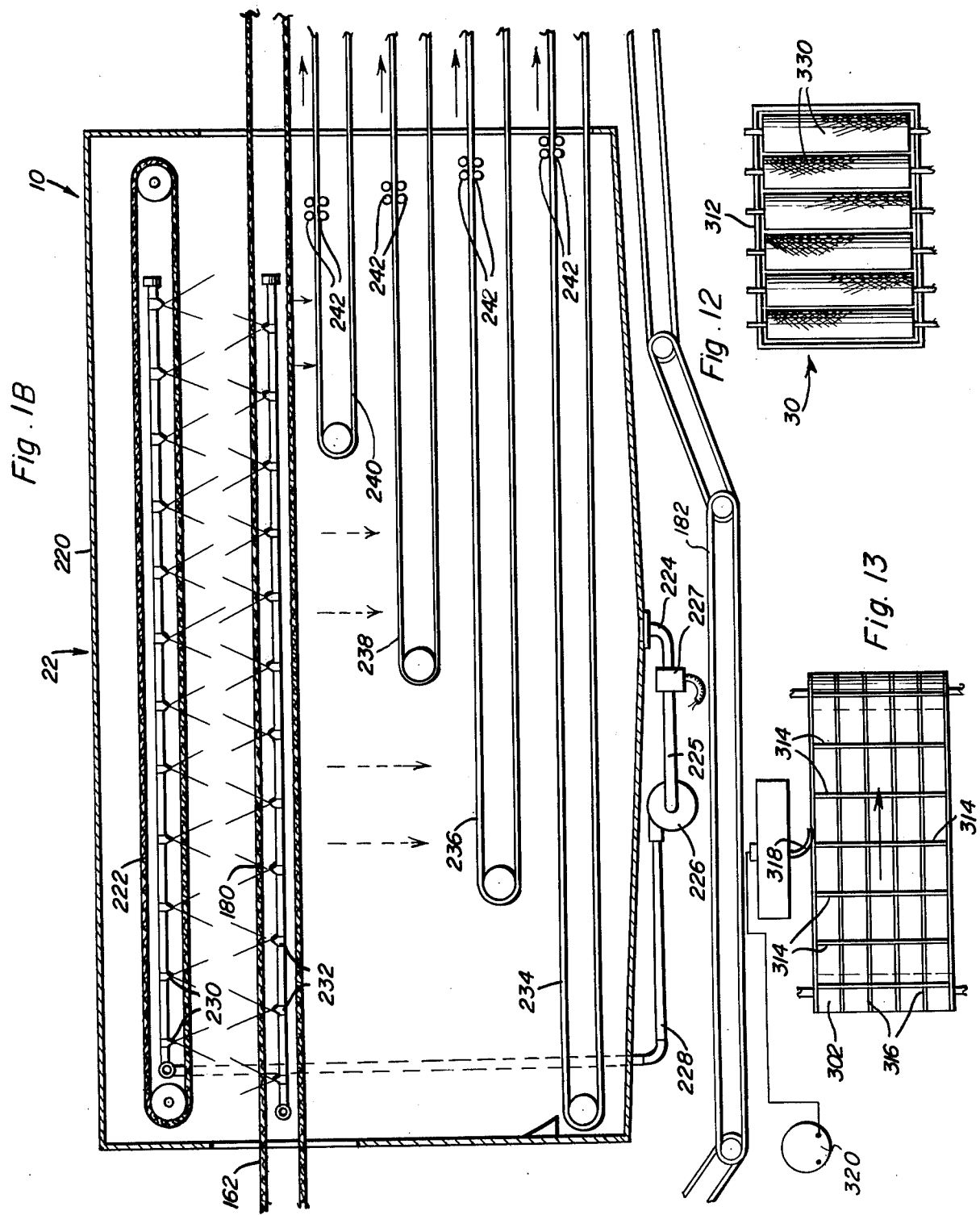

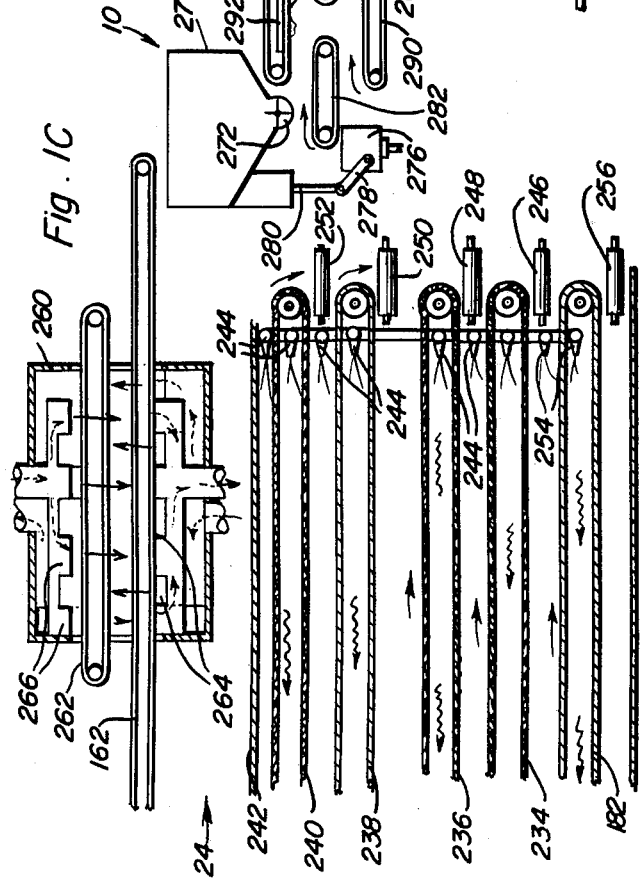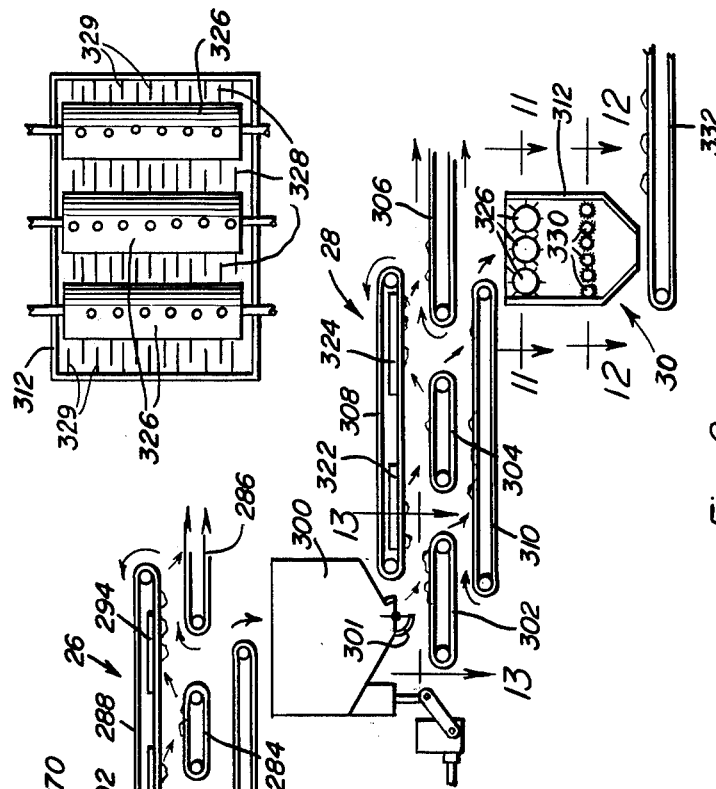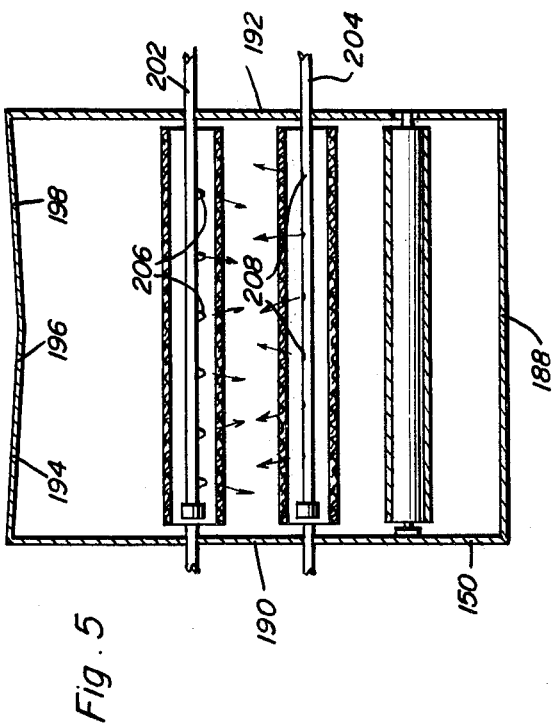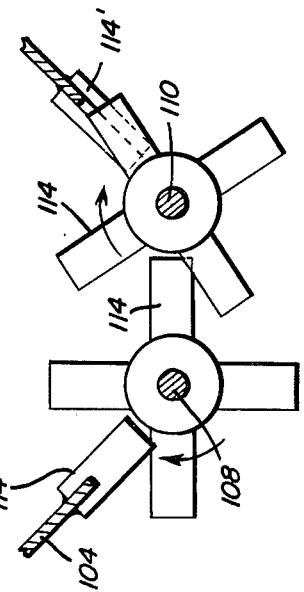

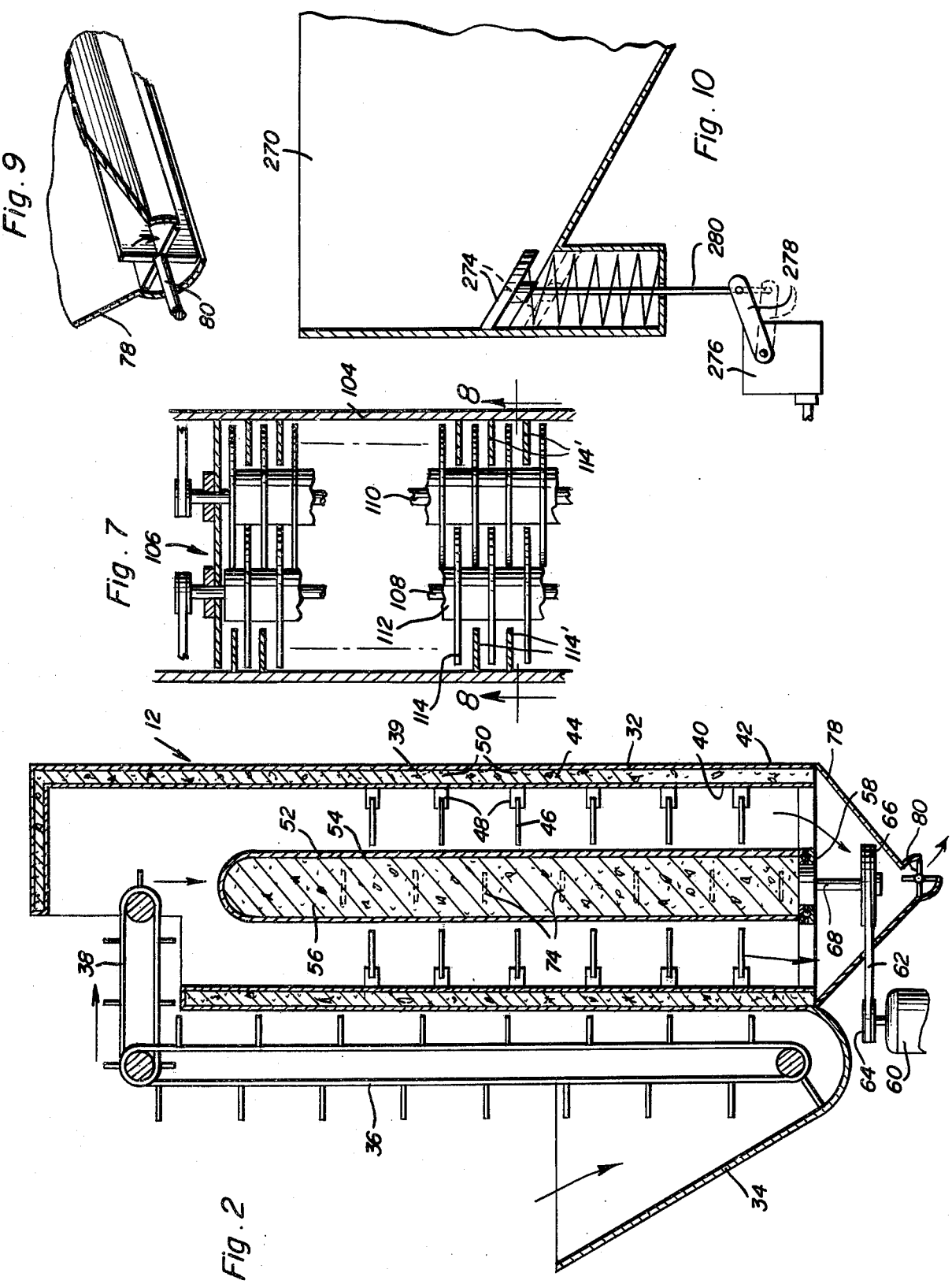

GARBAGE RECYCLING APPARATUS

The application comprises a continuation-in-part of my co-pending U.S. Pat. application Ser. No. 484,450, filed June 28, 1974, for Garbage Recycling Apparatus, now abandoned.

BACKGROUND OF THE INVENTION

In the past most industrial and domestic waste, including garbage and trash, has been collected, compacted and disposed of as land fill material. While some attempts were made in the past to recycle waste of this type by collecting the same and separating the waste into its basic components for reprocessing purposes to thus conserve, by reuse, a considerable amount of this country's natural resources, these earlier attempts were not successful partly due to lagging technology and lack of wide interest. However, interests in recycling trash have been reinstituted in view of present awareness of the astonishing rate at which this country's natural resources are being depleted.

Various methods and apparatuses have been heretofore designed for recycling waste including garbage and trash, but most of these have not been efficient to the extend of widespread acceptance.

Examples of various forms of apparatus and methods for recycling wastes heretofore known are disclosed in U.S. Pat. Nos. 2,307,059, 2,942,792, 3,159,353, 3,524,594, 3,549,092, 3,579,320, 3,650,396, 3,670,968, 3,736,120, 3,802,631 and 3,817,458.

BRIEF DESCRIPTION OF THE INVENTION

The apparatus of the instant invention is constructed in a manner whereby waste being recycled thereby is initially decompacted at a metered rate and thereafter weighed at a metered rate to separate and extract the heavier portions of the trash. The remainder is subsequently coarse shredded, fine shredded and thereafter pulverized at metered rates, after which the trash is washed for the separation of particles of pulverized glass therefrom and to extract, by various grades, fibrous materials from the remaining trash. The remaining trash is thereafter dried and sequentially acted upon to remove ferrous materials and aluminum therefrom.

The main object of this invention is to provide an apparatus which will be capable of performing sequential operations on trash to be recycled to thereby separate and process the basic components of the trash in a manner enabling their ready reuse.

Another object of this invention is to provide a trash recycling apparatus in accordance with the preceding object and including structural and operational features thereof specifically designed to effectively process and separate various trash components, such as wood pulp materials, plastics, glass, ferrous materials, and aluminum.

A final object of this invention to be specifically enumerated herein is to provide an apparatus which will conform to conventional forms of manufacture, be of relatively simple construction and dependable in operation, so as to provide a device that will be economically feasible, long lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1A is a partial schematic view illustrating a first initial section of the recycling apparatus;

FIG. 1B is an enlarged longitudinal vertical sectional view illustrating a second intermediate portion of the apparatus;

FIG. 1C is a schematic view illustrating a third final section of the apparatus;

FIG. 2 is an enlarged fragmentary vertical sectional view illustrating the initial trash decompacting section of the apparatus;

FIG. 3 is an enlarged horizontal sectional view taken substantially upon the plane indicated by the section line 3—3 of FIG. 1A;

FIG. 4 is an enlarged horizontal sectional view taken substantially upon the plane indicated by the section line 4—4 of FIG. 1A;

FIG. 5 is an enlarged transverse vertical sectional view taken substantially upon the plane indicated by the section line 5—5 of FIG. 1A;

FIG. 6 is a fragmentary perspective view illustrating the coacting blade action of the stationary and rotary blades of the assemblage illustrated in FIG. 3;

FIG. 7 is a fragmentary enlarged horizontal sectional view on somewhat of an enlarged scale taken substantially upon the plane indicated by the section line 7—7 of FIG. 1A and illustrating the apparatus by which the trash is fine shredded after having been coarse shredded;

FIG. 8 is a fragmentary vertical sectional view taken substantially upon the plane indicated by the section line 8—8 of FIG. 7;

FIG. 9 is a fragmentary perspective view illustrating the metering structure by which the trash is discharged at a metered rate from the initial decompacting apparatus and also the pulverizing apparatus as well as subsequent structure of the invention.

FIG. 10 is a fragmentary vertical sectional view illustrating the structure by which the partially processed trash discharged into a receiving hopper at a rate in excess of the rate of the trash being discharged from the hopper may be more quickly discharged from the hopper by speeding up the motorized discharge structure therefor.

FIG. 11 is an enlarged horizontal sectional view taken substantially upon the plane indicated by the section line 11—11 of FIG. 1C;

FIG. 12 is an enlarged fragmentary horizontal view taken substantially upon the plane indicated by the section line 12—12 of FIG. 1C; and FIG. 13 is an enlarged horizontal sectional view taken substantially upon the plane indicated by the section line 13—13 of FIG. 1C illustrating a portion of the apparatus by which aluminum is separated from the trash.

DETAILED DESCRIPTION OF THE INVENTION

Referring now more specifically to the drawings, the numeral 10 generally designates the garbage recycling apparatus of the instant invention. The apparatus 10 includes a decompacting section referred to in general by the reference numeral 12, a coarse shredding section referred to in general by the reference numeral 14 and including a fine shredding section referred to in general by the reference numeral 16, a pulverizing section referred to in general by the reference numeral 18, a washing section referred to in general by the reference numeral 20, a differential paper fiber separation section referred to in general by the reference numeral 22, a drying section, referred to in general by the reference numeral 24, a ferrous material separating section referred to in general by the reference numeral 26, an aluminum separating section referred to in general by the reference numeral 28 and a final chip processing section referred to in general by the reference numeral 30.

The first section 12 includes an upright decompacting mill 32 including a trash receiving hopper 34 and an upstanding endless conveyor 36 for conveying trash from the hopper 34 at a metered rate upwardly therefrom and along an upper horizontal portion 38 of the conveyor 36 for downward discharge into the interior of the upstanding decompacting mill 32. The conveyor 36 is suitably driven by any suitable motor means (not shown) and the decompacting mill 32 includes an upstanding cylindrical body 39 including spaced inner and outer thin metal walls 40 and 42 with concrete or other cementitious material 44 filling the void between the opposing surfaces of the walls 40 and 42. The decompacting mill 32 includes vertically spaced sets of circumferentially spaced stationary blades 46 which extend generally radially inwardly from the inner wall 40 and have their outer ends supported from spring arms 48 anchored relative to the inner and outer walls 40 and 42 and the cementitious material 44 by means of base end portions 50 extending through both the inner wall 40 and outer wall 42 and anchored in the material 44. In addition, the mill 32 includes a center upstanding column 52, see FIG. 3, comprising a thin metallic cylindrical wall 54 filled with cementitious material 56 and the column has its lower end journaled centrally within the lower end of the mill 32 as at 58. An electric motor 60 is drivingly connected to the column 52 by means of an endless flexible drive member 62 drivingly coupling an output pulley 64 of the motor 62 and an input pulley 66 mounted on a lower drive shaft portion 68 of the column 52. The column 52 includes blades 70, corresponding to the blades 46, supported from spring arms 72 corresponding to the spring arms 48 and the spring arms 72 are anchored within the material 56 in column 52 by means of base portions 74 extending diametrically through the column 52. The blades 70 of the column 52 are disposed in diametrically opposite pairs spaced along the column 52 and the sets of blades 46 are spaced intermediate adjacent diametrically opposite pairs of blades 70.

The lower end of the mill 32 includes a hopper bottom 78 equipped with a rotary discharge structure 80 of the metering type. The discharge structure 80 is suitably driven by a power source (not shown) of any desired type and functions to discharge treated trash from the hopper bottom 78 at a metered rate.

A motor driven horizontal conveyor 82 is disposed beneath the structure 80 and is hingedly supported at one end as at 84 and counterbalanced at the other end by means of a counterbalancing weight system 86. When a heavy piece of trash, such as large pieces of steel, cast iron or other heavy materials, drops on to the conveyor 82, that end of the conveyor 82 swings downwardly in order that the heavier piece of trash may be deposited into a collection receptacle 88 provided therefor beneath the counterbalanced end of the conveyor 82.

The section 14 is constructed in a manner substantially identical to the section 12 in that it includes an upstanding conveyor 90 for receiving material from the discharge counterbalanced end of the conveyor 82 and the conveyor 90 includes an upper horizontal portion 92 for discharging into the upper end of a shredder mill 94 comprising the section 14. The mill 32 actually being utilized to decompact trash discharged thereinto, whereas the shredder mill 94 having as its prime function the gradual shredding of trash discharged thereinto. The mill 94 includes spring mounted blades 96 corresponding to the blades 46 and blades 98 corresponding to the blades 70. However, the vertical spacing between the sets of blades 96 decreases downwardly toward the lower end of the mill 94 and the spacing between the sets of blades 98 decreases downwardly toward the lower end of the mill 94. Further, the mill 94 includes two radially outwardly projecting diametrically opposite blades 98 in each set of blades carried by the column 100 corresponding to the column 52, and the upper blades 96 and 98 are relatively dull for pulling and tearing the trash apart while progressively lower blades 96 and 98 are sharper for cutting and thus reducing the chip size of the trash. Further, the column 100 is journaled from the bottom of the mill 94 in a manner similar to the manner in which the column 52 is journaled from the bottom of the mill 32 and the column 100 is driven by a motor 102 corresponding to the motor 60.

The lower end of the mill 94, however, while including a hopper bottom 104 corresponding to the hopper bottom 78, includes a fine shredding assembly referred to in general by the reference numeral 106 comprising the section 16. The assembly 106 includes at least one pair of driven parallel horizontal shafts 108 and 110 journalled from the hopper bottom 104 and the shafts 108 and 110 include alternate axially spaced spacer sleeves 112 and cutting blades 114. The cutter blades 114 on each shaft include outer peripheral portions which swing closely pass the spacer sleeves 112 of the other shaft and the blades 114 of the shafts 108 and 110 are disposed in interdigitated relation and the opposite sides of the hopper bottom 104 include stationary inwardly projecting blades 114' between which the blades 114 of the shafts 108 and 110 swing. The assembly 106 comprises an apparatus whereby materials shredded within the mill 94 may be fine shredded and in effect, screened to within a predetermined size range determined by the spacing between adjacent blades 114 and 114'.

A horizontal conveyor 116 is disposed beneath the assembly 106 for receiving finely shredded material therefrom at a metered rate determined by the speed of operation of the shredding assembly 106 and material dropping onto the conveyor 116 is conveyed to a third upstanding conveyor 118 which also includes a horizontal upper end portion 120 discharging into the upper end of a pulverizing mill 122 similar to the mills 32 and 94 and defining the section 18. The mill 122, see FIG. 4, includes a body 123 defining adjoining partial cylindrical internal cavities 124 and 126 which open horizontally into each other and extend vertically along the mill 122. The mill 122 includes inner and outer walls 128 and 130 corresponding to the walls 40 and 42 and also cementitious material 132 disposed between the walls 128 and 130.

A pair of square columns 136 and 138 are journaled from their lower ends within the mill 122 and include four radially outwardly projecting blade portions 140, each, which extend outwardly from the vertically extending corner portions of the columns 136 and 138. The lower ends of the columns 136 and 138 are geared together for simultaneous and equal rotation as at 142 and driven by any suitable means (not shown). As may be seen from FIG. 4 of the drawings, the blades 140 of one column swing inwardly between blades 140 of the other column and thereby discharge material directly onto the opposing flat surface 139 of the other column for pulverizing any particles such as glass within the trash being passed through the mill 122. Further, the blades 140 are alternately notched as at 141 to insure downward movement of the trash being treated in the mill 122.

The lower end of the mill 122 includes a hopper bottom 144 corresponding to the hopper bottom 78 and including a rotary discharge structure 146 corresponding to the structure 80, but including screen mesh baffler 147, whereby material processed within the mill 122 may be discharged therefrom in a metered manner.

The section 20 includes a wash tank 150 and a rinse tank 152. A washing solution is circulated through the tank 150 by means of an inlet 154 and an outlet 156 in any convenient manner and rinse water is circulated through the tank 152 through an inlet 158 and an outlet 160. The section 20 includes a first conveyor 162 which extends from one end of the tank 150 to the opposite end of the tank 152. The conveyor 162 includes an upper inlet section disposed beneath the structure 146 and above the washing solution level 164 in the tank 150, a lower section 166 disposed below the level 164, a third section 168 elevated above the level 164 for passing material thereon from the tank 150 to the tank 152 and a fourth section 170 disposed below the level 172 of rinse water within the tank 152. Of course, the conveyor 162 includes inclined sections 174 extending from the inlet section to the section 166, an inclined section 176 connecting the sections 166 and 168 and an inclined section 178 connecting the sections 168 and 170. Further, the conveyor 162 also includes an elevated discharge section 180 disposed above the level 172 for conveying material from the tank 152.

The conveyor 162 comprises a screen-type of conveyor whereby small particles thereon will fall downwardly therethrough. These small particles are caught by a lower conveyor 182 disposed below and generally paralleling the conveyor 162 throughout its entire length, major portions of the conveyor 182 being disposed below the levels 164 and 172.

Still further, the section 20 includes a third upper conveyor 184 which overlies and substantially parallels the conveyor 162, the conveyor 184 including outwardly projecting longitudinally spaced partitions 186. Furthermore, it is pointed out that the tank 150 includes a bottom wall 188, upstanding opposite side walls 190 and 192 and a top wall 194. The top wall 194 includes inwardly and downwardly inclined opposite side portions 196 and 198 and extends across the top of the tank 150 between the side walls 190 and 192 only in the central portion of the tank 150. Further, the tank 152 is similarly constructed and includes a top wall 200 corresponding to the top wall 194, see FIG. 1A.

With attention now invited more specifically to FIGS. 1A and 5 of the drawings, it may be seen that transverse air pipes 202 and 204 extend transversely through the tank 150 at points spaced therealong between the upper and lower reaches of the belts or conveyors 184 and 162, respectively, in the areas thereof disposed beneath the top wall 194. The pipes 202 and 204 are supplied with air under pressure from any suitable source (not shown) and the pipes 202 and 204 include longitudinally spaced downwardly and upwardly opening outlets 206 and 208, respectively, the pipes 202 and 204 being staggered longitudinally of the tank 150. Further, corresponding pipes 210 and 212, also supplied with air under pressure, are disposed between the upper and lower reaches of the belts 184 and 162 in the tank 152 below the top wall 200 and the pipes 210 and 212 are provided with outlets corresponding to the outlets 206 and 208.

The belt 162, after leaving the tank 152, passes through a housing 220 comprising the section 22 and is opposed by an upper conveyor 222 disposed within the housing 220 above the conveyor 162. The bottom of the housing 220 defines a sump and includes a drain 224 communicated with the inlet of a motor driven pump 226 by a pipe 225 including an electric heater 227 and the pump includes an outlet pipe 228 which extends to longitudinally spaced downwardly and upwardly facing jets 230 and 232 spaced across the longitudinally of the conveyor 222 between the upper and lower reaches thereof and also that portion of the conveyor 162 disposed within the housing 220. The jets 232 are spaced between the upper and lower reaches of the conveyor 162.

The processed trash moving into the housing 220 is thereby acted upon by alternating upwardly directed and downwardly directed progressively stronger jets of heated water and various grades of fibrous material, such as typing paper, paper bags, cardboard and the outer layer of corrugated cardboard, moving along the conveyor 162 are broken up and fall downwardly through the belt 162 onto conveyor belts 234, 236, 238 and 240 staggered vertically and longitudinally within the housing 220 in stair step fashion. The jet of water from the jets 230 and 232 may be made progressively stronger by utilizing progressively larger outlet openings therein. The upper reaches of each of the belts 234, 236, 238 and 240 have squeeze drying rollers 242 operatively associated therewith whereby fibrous materials being conveyed outwardly of the housing 220 on the belts 234, 236, 238 and 240 are squeeze dried.

The belts 234, 236, 238 and 240, after passing outwardly of the housing 220, pass into a drying tunnel 242 and are then acted upon by hot drying air being discharged from jets 224 whereby the fibers disposed on the belts will be dried before being discharged onto associated belts 246, 248, 250 and 252 for conveying the dried fibrous materials to suitable collection points (not shown). In addition, the discharge end of the conveyor or belt 182 passes through tunnel 242 and is acted upon by hot air being discharged from discharge nozzles 254 whereby the glass chips collected on the belt 182 in the section 20 are dried before being discharged onto an associated conveyor 256 for conveying to a collection point (not shown).

The discharge end of the belt 162 also passes through a drying chamber 260 including an upper screen-type of conveyor belt 262 overlying the belt 162 and the chamber 260 includes alternating upwardly and downwardly directed hot air outlets 264 and 266 spaced below and above the belts or conveyors 162 and 262 and to which heated air under pressure is supplied from any suitable source. The outlets 264 and 266 tumble and subject the remaining chips of garbage or trash disposed on the belt 162 to alternating drying air currents of heated air and when the chips exit from the housing 260 on the belt 184 they are discharged into an upwardly opening hopper 270. The hopper 270 includes a discharge structure 272 corresponding to the structure 80 and further includes a spring biased weight sensing plate 274 connected to a motor control unit 276 through an actuating throttle 278 and operating rod 280, the unit 276 serving to control the speed of the motors (not shown) driving the discharge structure 272 and the conveyors 282, 284, 286, 288 and 290, whereby if the hopper 270 tends to fill up the speed of the motors is increased and if the hopper 270 tends to empty the speed of the motors is reduced. The plate 274 is, of course, utilized to control the flow of the dried chips being discharged into the hopper 270 and discharged therefrom.

Three longitudinally spaced horizontal conveyors 282, 284 and 286 are positioned at an elevation below the discharge structure 272 with the conveyor 282 underlying the discharge structure 272 for receiving material therefrom. An upper conveyor 288 bridges the conveyors 282, 284 and 286 and a lower conveyor 290 is dispersed below and bridges the conveyors 282 and 284. The upper conveyor 288 closely overlies the belts 282, 284 and 286 and a stationarily supported permanent magnet 292 is spaced immediately above the lower reach thereof in position bridging the adjacent ends of the conveyors 282 and 284 and a second stationarily supported permanent magent 294 is spaced immediately above the lower reach in position bridging the adjacent ends of the conveyor belts 284 and 286, the upper reaches of the belts 282 and 284 and the lower reach of the conveyor 288 being driven to the right as viewed in FIG. 1C.

The discharge end of the belt 290 discharges into a second hopper 300 which corresponds directly to the hopper 270 and three conveyor belts 302, 304, and 306 corresponding to the belts 282, 284 and 286 are operatively associated with the discharge structure 301 of the hopper 300. Further, an upper belt 308 corresponding to the belt 288 and a lower belt 310 corresponding to the belt 290 are also provided, the belt 310 discharging into a final hopper 312.

With attention now invited more specifically to FIG. 13 of the drawings, it may be seen that the belt 302, and also the belt 304, is constructed of an insulated material, such as rubber. The belt 302 includes a cross network of conductive wires 314 and 316 to which a static electric charge is provided by a brush 318 connected to an electrostat generator 320 of any suitable type. Stationary and negatively charged plates 322 and 324 are spaced along and disposed immediately above the lower reach of belt 308, with the plate 322 bridging the adjacent ends of the conveyors 302 and 304 and the plate 324 bridging the adjacent ends of the conveyors 304 and 306.

The upper portion of the hopper 312 has a plurality of rolls 326 journaled therein and each of the rolls 326 is provided with a plurality of longitudinally and circumferentially spaced spikes 328 similar to blades 114. The rolls 326 are driven in the same direction by any suitable power source (not shown) and the spikes 328 swing into close position relative to the adjacent rolls with the spikes of each roll spaced longitudinally thereof relative to the spikes of the adjacent rolls. Further, the opposite sides of the hopper bottom include inwardly projecting stationary blades 329, similar to spikes 114', between which the adjacent blades 328 swing. Finally, a plurality of cylindrical grinding members 330 are journaled in the lower portion of the hopper 312 and are driven from any suitable power source in the same direction and the lower end of the hopper 312 discharges onto a final discharge conveyor 332.

In operation, the trash and/or garbage to be recycled is dumped into the hopper 34 and is at least partially decompacted by means of the conveyor 36 which conveys the trash upwardly to the upper horizontal portion 38 of the conveyor 36 in a metered manner. The trash is discharged from the upper portion 38 down into the decompacting mill 32 and is acted upon by the blades 46 and 70 therein. As the trash moves downwardly through the mill 32, it is decompacted and passes into the hopper bottom 78 of the mill 32 from which the decompacted trash is discharged at a metered rate by means of the discharge structure 80. The trash is discharged onto the conveyor 82 which conveys the trash to the conveyor 90. If any heavy particles of trash are deposited on the conveyor 82, the latter will swing downwardly to the phantom line position thereof illustrated in FIG. 1A to deposit the heavy trash components into the receptacle 88 and to contact and thus open normally closed switch 82' so as to shut down the motors driving the conveyor 82 and the discharge structure 80.

Thereafter, the conveyor 82 will swing back upwardly to the solid line position thereof to allow the switch 82' to close and the trash to again be deposited onto the conveyor 82 for movement therealong to the upstanding conveyor 90 for conveying upwardly therealong at a metered rate onto the upper end portion 92 thereof and discharging into the shredder mill 94. As the trash is discharged at a metered rate into the top of the shredder mill 94, it falls downwardly and is acted upon by the blades 96 and 98 corresponding to the blades 46 and 70 and is initially torn apart and thereafter gradually shredded into finer particles by the blades 96 and 98. Then, the shredded material falls down into the hopper bottom 104 of the mill 94 and is finely shredded by the blade members 114 of the section 16. The spikes or blade members 114 also serve to screen and discharge shredded material from the mill 94 at a metered rate down onto the conveyor 116 whereupon the material is conveyed to the third upstanding conveyor 118. The material is then conveyed upwardly to the upper portion 120 of the conveyor 118 and discharged downwardly into the mill 122. The material is acted upon by the blades 140 and the flat surfaces of the columns 136 and 138 so as to substantially pulverize all of the frangible particles of the trash. Thereafter, the trash is metered through the discharge structure 146 by the screen mesh baffles 147 thereof, down onto the belt 162 and conveyed down into the washing solution within the tank 150, which washing solution is flowing through the tank 150 to the direction opposite to which the trash is moving through the tank 150. The trash on the belt 162 is acted upon by the alternate upward and downward jets of air being discharged from the nozzles 208 and 206 and the small particles of glass within the trash fall downwardly through the screen belt 162 onto the belt 182, the partitions 186 of the conveyor 184 serving to partially contain the trash moving along the section 166 of the belt 162.

Thereafter, the trash or chips remaining on the belt 162 and the glass collected on the belt 182 move upwardly out of the tank 150 and down into the tank 152 whereby the chips on the belt 162 are rinsed and further subjected to upward and downward jets of air from the pipes 212 and 210. Then, the chips remaining on the belt 162 move upwardly and out of the tank 152 with the glass supported from the belt 182. The chips supported on the section 162 pass into the housing 220 for acting upon by the progressively stronger jets of hot water being discharged from the nozzles 230 and 232 whereupon the fibrous content of the trash is differentially separated by grade and falls downwardly, through the section 180, onto the belts 234, 236, 238 and 240. The fibrous materials moving outwardly of the housing 220 on the belts 234, 236, 238 and 240 are squeezed dry between the rollers 242 and the remaining trash passing outwardly of the housing 220 on the belt 162 passes through the drying chamber 262 and is acted upon by the alternate upward and downward jets of air being discharged from the outlets 264 and 266. The squeeze dried fibrous materials from the belts 234, 236, 238 and 240 are acted upon by the jets of hot air being discharged from the nozzles 244 and the fibrous materials are then discharged onto the belts 246, 248, 250 and 252. Also, the discharge end of the belt 182 upon which the glass particles are disposed is also acted upon by jets of heated drying air from the jets 254 before the glass particles are discharged from the belt 182 onto the belt 256. As hereinbefore set forth, the belts 246, 248, 250 and 252 as well as the belt 256 extend to suitable collection points (not shown).

After the remaining chips of trash pass through the housing 260 are dried therein by the alternate upward the downward jets of drying air, the chips are discharged off the discharge end of the belt 194 into the hopper 270 from which they are discharged at a metered rate so as to spread the chips on the belt 282 in a thin layer. As the remaining particles pass toward the discharge end of the belt 282, the ferrous portions of the trash are magnetically attracted upwardly by the magnet 292 and subsequently conveyed along therebeneath by the lower reach of the belt 288 and dropped onto the belt 284 after which they are again drawn upwardly by the magnet 294 again conveyed by the lower reach of belt 288 and subsequently dropped onto the belt 286. In this manner, the ferrous particles of trash are separated from the remainder of the trash and are conveyed by the belt 286 to a suitable collection point (not shown). The remaining trash falls downwardly onto the belt 290 and is subsequently discharged into the hopper 300 from which it is discharged in a metered manner by means of the discharge structure 301.

After the material discharged into the hopper 300 is discharged therefrom, in a thin layer, onto the belt 302, it is sequentially subjected to a positive charge above the belt 302, a negative charge on the lower reach of the belt 308 by plate 322, a positive charge on the belt 304 and the negative charge above the lower reach of belt 308 by the plate 324. Accordingly, any aluminum particles within the trash are positively charged on the belt 302 and thus are attracted to the negative charged plate 322 for separation from the remainder of the trash. Further, the aluminum is subsequently again positively charged by the belt 304 and subjected to the negatively charged plate 324 whereby the material discharged from the underside of the belt 308 onto the belt 306 is substantially all aluminum. The remaining trash, such as plastic particles, small residual amounts of glass, aluminum, paper and other non-ferrous materials, is discharged from the belt 310 into the hopper 312 and is further reduced in size by the rolls 326 and finely ground by the rolls 330 before being discharged onto the belt 332 for collection at a suitable point (not shown).

In this manner, substantially all of the readily separable components of trash are separated and collected. In addition, the separable components are washed, rinsed and dried and therefore need not be further processed for acceptance as suitably reuseable materials.

As may be seen from FIG. 1C and FIG. 10, the hopper 300 is provided with components corresponding to components 274, 276, 278 and 280 for controlling the speed of the motors driving the discharge structure 301 and the conveyors 302, 304, 306, 308 and 310. Further, the hopper 104 is preferably also provided with similar components (not shown) for controlling the speed of the fine shredding assembly 106 and the conveyor 116. Still further, the conveyor 82 is operatively associated with a switch 82' for controlling the operation of conveyor 82 and discharge structure 80 for interrupting their operation when the conveyor swings to the phantom line position of FIG. 1A and the hopper 312 is preferably provided with structure, not shown, corresponding to the structure 274, 276, 278 and 280 for controlling the speed of operation of the components 326, 330 and 332.

Further, the transition of material from the discharge end of one conveyor belt to the inlet end of an adjacent relatively angulated conveyor belt may be accomplished in any convenient manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. The method of recycling compacted waste including various forms of paper and pulp wood products, metal and glass containers, and plastics, said method comprising:
    a. decompacting the waste at a metered rate;
    b. weighing the decompacted waste at a metered rate and separating the heavier portions of waste from the remainder thereof;
    c. coarse shredding the remaining waste at a metered rate and in a manner to gradually reduce the remaining waste to increasingly smaller shredded material;
    d. fine shredding the shredded material at a metered rate;

e. passing the fine shredded material through a pulverizing mill at a metered rate to break up and pulverize the pieces of glass therein;
f. moving the discharge from the pulverizing mill through a wash bath on an upper foraminated horizontal conveyor belt disposed above a lower generally horizontal conveyor belt while subjecting the material being washed to alternating upward and downward jets of air under pressure;
g. collecting the smaller particles of glass which fall through the foraminated belt on the lower belt;
h. passing the remaining washed material through a second rinse bath on an upper foraminated horizontal conveyor belt disposed above a lower generally horizontal belt supporting the collected smaller particles and subjecting the remaining washed material on the upper belt to further alternating up and down jets of air under pressure and collecting, on the lower belt, the smaller particles of glass which fall through the upper belt;
i. separately drying the remaining washed material and the collected particles of glass;
j. spreading the remaining dried material in a thin layer and acting upon the thin layer with a field of magnetic flux to remove the ferrous materials therefrom; and
k. electrostatically separating particles of aluminum from the remaining material after the magnetic separation of ferrous materials therefrom.

2. The method of claim 1 including grinding the remaining material, after separation of particles of aluminum therefrom, into fine powder.

3. The method of claim 1 wherein (a) includes the downward passage of the material to be decompacted through an upstanding cylindrical body with stationarily mounted inwardly directed peripherally and vertically spaced blades and having an upstanding shaft portion therein driven about its longitudinal axis and equipped with generally radially outwardly projecting and radially and vertically spaced yieldably mounted blades spaced vertically between adjacent levels of vertically spaced stationary blades.

4. The method of claim 3 wherein (c) includes the downward passage of the material to be shredded through an upstanding cylindrical body with stationarily mounted inwardly directing peripherally and vertically spaced blades and having an upstanding shaft portion therein driven about its longitudinal axis and equipped with rigidly mounted generally radially outwardly projecting and radially and vertically spaced blades vertically between adjacent levels of vertically spaced coacting stationary blades, the vertical spacing between adjacent levels of stationary and rotating blades decreasing downwardly in the last mentioned cylindrical body.

5. The method of claim 4 wherein (d) includes the downward passage of material between side-by-side driven horizontal rolls, including generally radially outwardly projecting and axially spaced blades interdigitated with each other.

6. The method of claim 1 wherein (c) includes the downward passage of the material to be shredded through an upstanding cylindrical body with stationarily mounted inwardly directed peripherally and vertically spaced blades and having an upstanding shaft portion therein driven about its longitudinal axis and equipped with rigidly mounted generally radially outwardly projecting and radially and vertically spaced blades spaced vertically between adjacent levels of vertically spaced coacting stationary blades, the vertical spacing between adjacent levels of stationary and rotating blades decreasing downwardly in the last mentioned cylindrical body.

7. The method of claim 1 wherein (d) includes the downward passage of material between side-by-side driven horizontal rolls, including generally radially outwardly projecting and axially spaced blades interdigitated with each other.

8. The method of claim 1 including breaking up and separating fibrous materials from the materials remaining on the upper belt after (h) and before (i).

9. The method of recycling compacted waste including various forms of paper and pulp wood products, metal and glass containers, and plastics, said method comprising:
a. decompacting the waste at a metered rate;
b. weighing the decompacted waste at a metered rate and separating the heavier portions of waste from the remainder thereof;
c. coarse shredding the remaining waste at a metered rate and in a manner to gradually reduce the remaining waste to increasingly smaller shredded material;
d. fine shredding the shredded material at a metered rate;
e. passing the fine shredded material through a pulverizing mill at a metered rate to break up and pulverize the pieces of glass therein;
f. moving the discharge from the pulverizing mill through a wash bath on an upper foraminated horizontal conveyor belt disposed above a lower generally horizontal conveyor belt while subjecting the material being washed to alternating upward and downward jets of air under pressure;
g. collecting the smaller particles of glass which fall through the foraminated belt on the lower belt;
h. passing the washed material through successive hot water sprays while simultaneously segregating a plurality of coarse and fine grades of fibrous materials from the remainder of the washed material and separately collecting the segregated fibrous materials;
i. drying the remaining material;
j. spreading the remaining material in a thin layer and acting upon the thin layer with a field of magnetic flux to remove the ferrous materials therefrom; and
k. electrostatically separating particles of aluminum from the remaining material.

10. The method of claim 9 including grinding the remaining material into at least fine granular form.

11. The method of claim 9 wherein (i) includes initially squeeze drying fibrous materials and thereafter air drying the fibrous materials with heated dry air.

12. The method of recycling compacted waste including various forms of paper and pulp wood products, metal and glass containers and plastics, said method comprising:
a. shredding the waste at a metered rate and in a manner to reduce the waste to smaller shredded material;
b. fine shredding the shredded material at a metered rate;
c. passing the fine shredded material through a pulverizing mill at a metered rate to break up and pulverize the pieces of glass therein;

d. moving the discharge from the pulverizing mill through a wash bath on an upper foraminated horizontal conveyor belt dispoed above a lower generally horizontal conveyor belt while subjecting the material being washed to alternating upward and downward jets of air under pressure;

e. collecting the smaller particles of glass which fall through the forminated belt on the lower belt;

f. passing the washed material through successive hot water sprays while simultaneously segregating a plurality of coarse and fine grades of fibrous materials from the remainder of the washed material and separately collecting the segregated fibrous materials;

g. drying the remaining material;

h. spreading the remaining material in a thin layer and acting upon the thin layer with a field of magnetic flux to remove the ferrous materials therefrom; and i. electrostatically separating particles of aluminum from the remaining material.

13. A pulverizing mill including an upstanding hollow housing defining a pair of side-by-side partial cylindrical cavities opening laterally into each other, a pair of upstanding rotors journaled in said cavities and including center columns having generally radially outwardly projecting and longitudinally extending blades supported therefrom for sweeping about the corresponding cavities, said rotors being connected together for simultaneous, equal and opposite rotation, the walls of each cavity opening into the other cavity along lines tangent thereto and extending generally radially of the other cavity, said columns including radially outwardly facing impact surfaces disposed between adjacent blades thereof, the blades of each rotor overlapping the blades of the other rotor longitudinally of said rotors, whereby the blades on adjacent sides of said columns may interedigitate with each other upon simultaneous and opposite rotation of said columns and the blades sweeping through each cavity may propel material from within the corresponding cavity, at its juncture with the other cavity, generally radially inwardly of the other cavity between adjacent peripherally spaced blades on the column in said other cavity for impact with the corresponding impact surface.

14. The combination of claim 13 wherein at least one blade of each rotor is equipped with outer edge notches spaced therealong.

15. A garbage recycling apparatus including first means for receiving compacted waste, decompacting the waste at a meterd rate and discharging the decompacted waste therefrom at a metered rate, second means for receiving decompacted waste from the first means and progressively shredding the waste, at a metered rate, into smaller particles and discharging the shredded waste at a metered rate, third means for receiving the shredded waste from the second means at a metered rate, pulverizing the frangible components of said shredded waste and discharging the shredded waste at a metered rate, fourth means for receiving the discharge of waste from said third means and subjecting the waste to a wash bath for separating the pulverized frangible components from the remainder of the waste and separately discharging the separated pulverized components and the remaining waste at a metered rate, fifth means for receiving the washed remaining waste from said fourth means at a metered rate and acting thereon with high pressure jets of fluid to break up and separate the fibrous components thereof, separating by grade, the broken up fibrous components from the then remaining waste and separately discharging the broken up fibrous components and remaining waste at a metered rate, sixth means for receiving the remaining waste from said fifth means and drying and discharging the remaining waste at a metered rate, seventh means for receiving the dried remaining waste from the sixth means, separating the ferrous components thereof and discharging the remaining waste therefrom at a metered rate, eighth means for receiving the discharged remaining waste from the seventh means, separating the aluminum components therefrom and discharging the remaining waste therefrom at a metered rate, and ninth means for receiving the discharged remaining waste from said eighth means and grinding the remaining waste into a fine powder at a metered rate.

16. The combination of claim 15 wherein said third means includes a pulverizing mill including an upstanding hollow housing defining a pair of side-by-side partial cylindrical cavities opening laterally into each other, a pair of upstanding rotors journaled in said cavities and including center columns having generally radially outwardly extending blades supported therefrom for sweeping about the corresponding cavities, said rotors being connected together for simultaneous and equal rotation, the walls of each cavity opening into the other cavity along lines tangent thereto and extending generally radially of the other cavity, said columns including radially outwardly facing impact surfaces disposed between adjacent blades thereof.

17. The combination of claim 15 wherein said first means includes an upstanding hollow housing defining a pair of side-by-side partial cylindrical cavities opening laterally into each other, a pair of upstanding rotors journaled in said cavities and including center columns having generally radially outwardly extending blades supported therefrom for sweeping about the corresponding cavities, said rotors being connected together for simultaneous and equal rotation, the walls of each cavity opening into the other cavity along lines tangent thereto and extending generally radially of the other cavity, said columns including radially outwardly facing impact surfaces disposed between adjacent blades thereof, cylindrical mill including sets of vertically spaced sets of radially inwardly projecting blades and a center rotary column in said mill equipped with vertically spaced sets of radially outwardly projecting blades said sets of blades of said mill and column being vertically spaced relative to each other.

18. The combination of claim 17 wherein at least said sets of inwardly projecting blades are yieldingly supported from the mill.

19. The combination of claim 15 wherein said fourth means includes an upstanding hollow cylindrical mill including sets of vertically spaced sets of radially inwardly projecting blades and a center rotary column in said mill equipped with vertically spaced sets of radially outwardly projecting blades, said sets of blades of said mill and column being vertically spaced relative to each other.

20. The combination of claim 16 wherein the vertical spacing between said sets of blades progressively decreases toward the lower end of said mill.

* * * * *